March 21, 1939. W. S. BOWEN 2,151,079
SEWAGE DISPOSAL SYSTEM
Filed Feb. 5, 1935 3 Sheets-Sheet 2
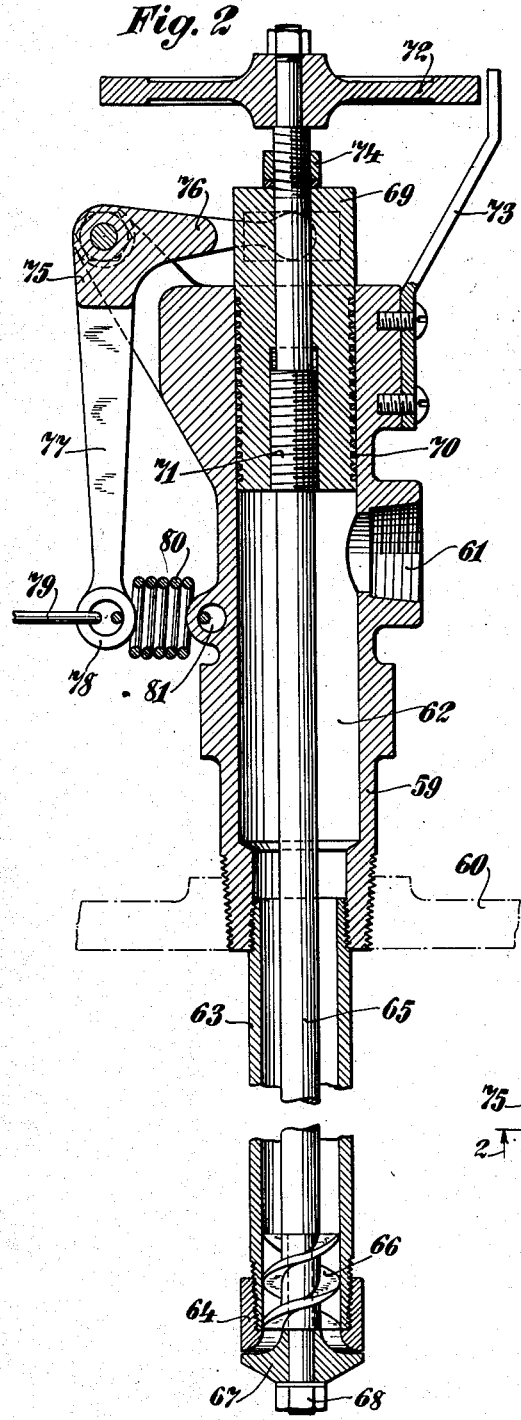
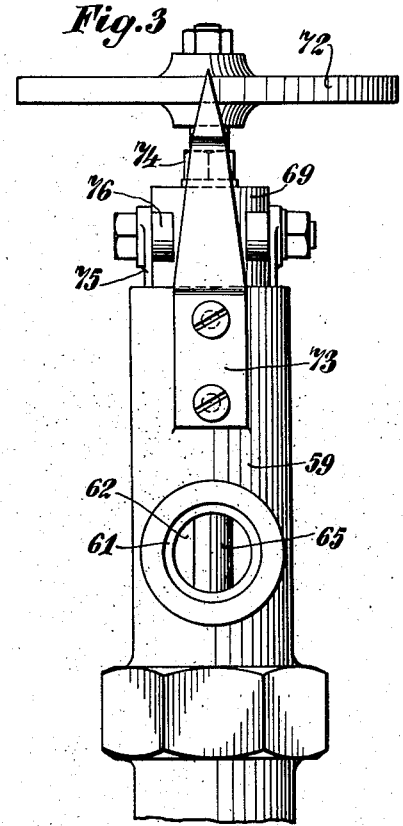
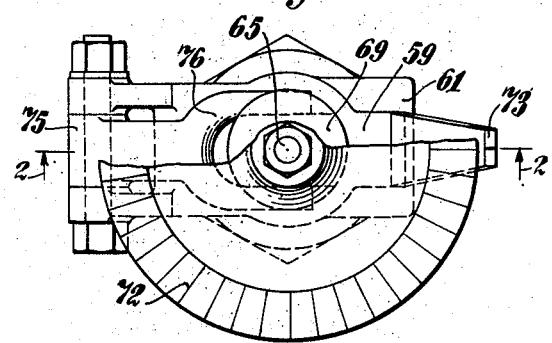
INVENTOR.
William Spencer Bowen,
BY Hoguet, Neary & Campbell,
HIS ATTORNEYS March 21, 1939.  W. S. BOWEN  2,151,079
SEWAGE DISPOSAL SYSTEM
Filed Feb. 5, 1935  3 Sheets-Sheet 3
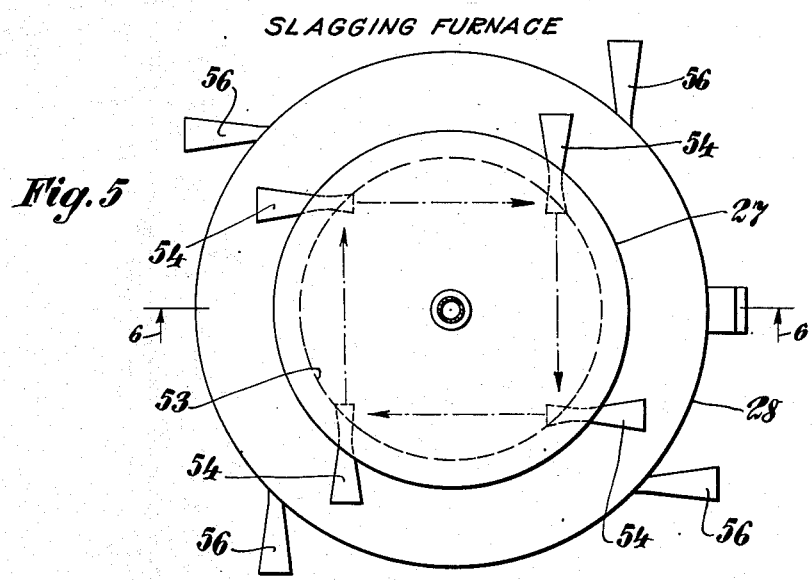
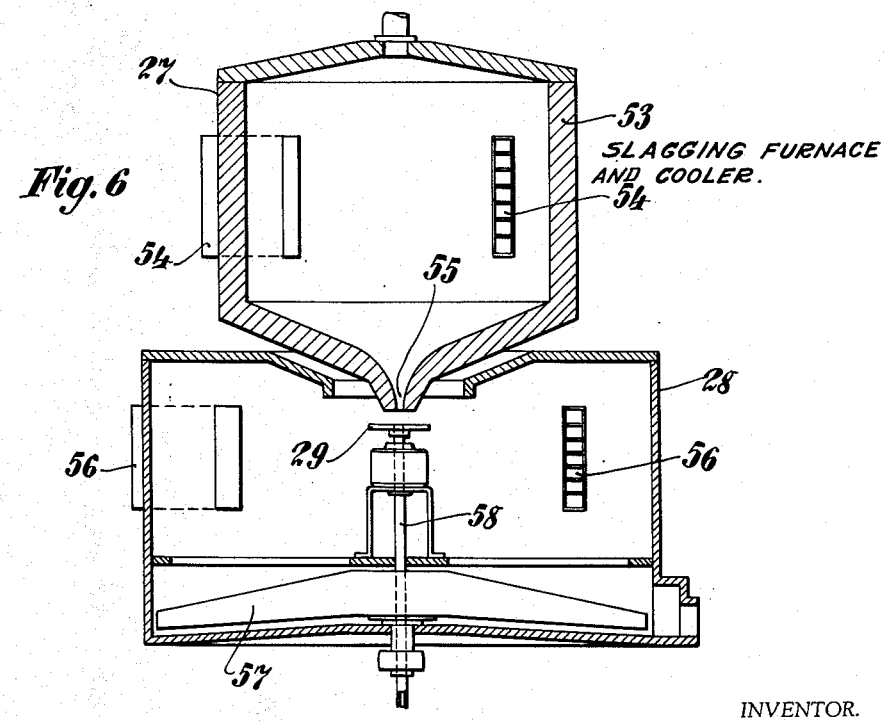
INVENTOR.
William Spencer Bowen,
BY
HIS ATTORNEYS Patented Mar. 21, 1939

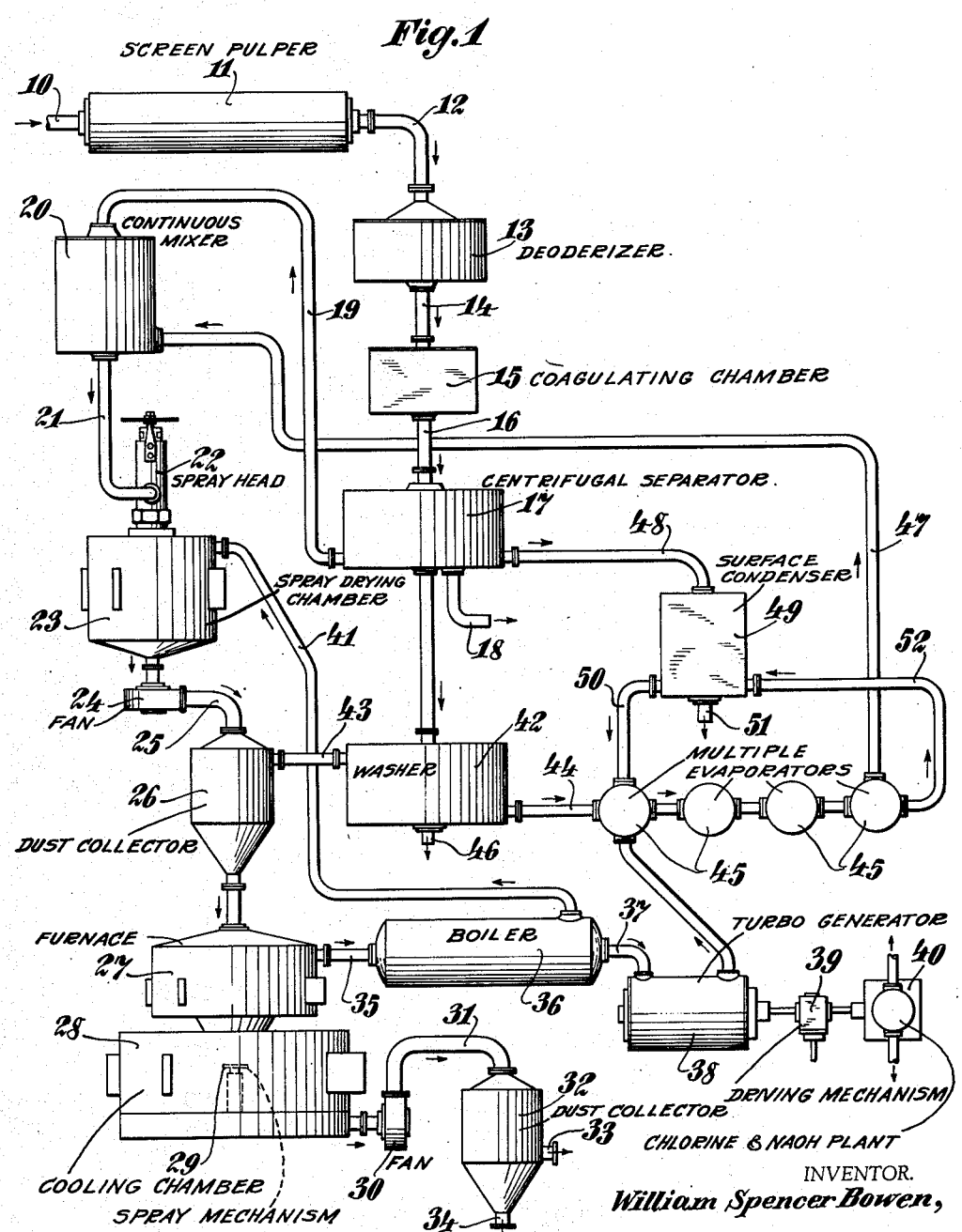

2,151,079

UNITED STATES PATENT OFFICE 2,151,079

SEWAGE DISPOSAL SYSTEM

William Spencer Bowen, Westfield, N. J.

Application February 5, 1935, Serial No. 5,153

6 Claims. (Cl. 210—2)

The present invention relates to sewage disposal systems and embodies, more specifically, an improved system by means of which raw sewage may be received, without any preliminary treatment, and treated in such fashion as to form waste effluent of a non-objectionable nature and other end products which may be either conveniently disposed of or utilized as commercial products or as products by means of which the treating process may be carried out.

Ordinarily, about half the solids in sewage are organic materials. It is these materials that give rise to difficulty in sewage disposal and many existing processes and systems treat such materials bacteriologically. Such treatment is effected by settling and digestion of the solids in large tanks, filter beds, drying beds, Imhoff tanks, sprinkling filters, activated sludge tanks, and vacuum filters. In most of these systems chlorine, or other deodorants, are used in various forms. Moreover, chemical coagulants of various types are added to aid in the removal of the suspended and colloidal solids. In this connection, extensive use is made of aerobic bacteria to consume the organic solids, and by slow oxidation, to change them to non-objectionable forms. However, after these various steps have taken place, the residue still must be disposed of. This residue consists of clear effluent containing soluble solids and about eighty per cent. dry filter cake of low grade fertilizer quality. Methane is produced in the Imhoff tanks and digesters. These existing steps require large and expensive equipment that cannot be located in the centers of population and therefore necessitate long and expensive sewer lines.

The present invention approches the problem of sewage disposal in both a chemical and mechanical fashion and does not require the use of biological and slow speed processes. In general, the sewage is mechanically treated to separate, effectively, the effluent from the solids and the solids are further treated to either dispose of them in an entirely efficient and satisfactory fashion, utilizing the heat content thereof in the carrying out of the process, or else treating them in such fashion as to render them commercially salable. In addition to the foregoing mechanical treatment, the sewage is treated chemically in an effective fashion to render the mechanical treatment possible and enable end products of desired characteristics to be obtained.

At this point it is to be noted that the invention is not limited specifically to the treatment of sewage, but may be highly useful in the disposition of garbage or other waste products, the adaptation of the invention thereto being obvious to one skilled in the art.

The primary end products resulting from the process of the present invention include one or more exhausts of deodorized air and vapor to the atmosphere, condensate, electric power, and chilled and powdered slag or ash. In this connection, it is to be noted that the B. t. u. content of the organic matter is from 7500 to 15,000 B. t. u. per pound of solid and is ample to carry out the process as outlined, with some surplus power available for the manufacture of electrolytic chlorine and sodium hydroxide from sodium chloride solution.

An object of the present invention, accordingly, is to provide a sewage disposal system by means of which raw sewage may be rapidly and effectively treated to form end products of non-objectionable nature which may be readily disposed of, and also products which are commercially salable.

A further object of the invention is to provide a sewage disposal system of the above character wherein the sewage is subjected to a purely chemical and mechanical treatment, the process being of such nature as to avoid the necessity of using large and expensive equipment.

A further object of the invention is to provide a method and apparatus for treating sewage and other waste products in such fashion as to form end products of commercially salable character as well as of a non-objectionable nature.

Further objects of the invention will be apparent as it is described in connection with the accompanying drawings, wherein Figure 1 is a combined schematic representation of an apparatus by means of which the present invention is carried out, as well as a flow diagram illustrating the process of the present invention;

Figure 2 is a view in section, taken on a plane passing through the axis of a spray head constructed in accordance with the present invention and adapted particularly for use in connection with systems of the character described herein. This view is taken on the line 2—2 of Figure 4 and looking in the direction of the arrows;

Figure 3 is a view in side elevation, showing the device of Figure 2;

Figure 4 is a plan view, partly broken away, to show details of the structure, and showing the device of Figure 2;

Figure 5 is a plan view of a slagging type furnace constructed in accordance with the present invention; and Figure 6 is a view in vertical section, showing the slagging type furnace of Figure 5 and also showing the cooling mechanism used in connection therewith.

With reference to Figure 1, sewage is introduced into the system at 10 and directed into a screen pulper 11, which may consist of a cylindrical horizontal screen with a rotating internal paddle that is helical in shape, the paddle wiping the interior of the screen and forcing all light material therethrough while directing all lumps and other material out at a suitable outlet. This mechanism serves to roughly separate the sewage from solid materials which are not suitable for treatment in accordance with the present invention, these materials being disposed of in any suitable fashion. For example, such materials may be introduced into a pulverizing or other mill and, after being pulverized, may be returned to the sewage disposal system at a suitable point.

The screened sewage is then directed through a pipe 12 into a deodorizer 13 where it is treated with chlorine or other suitable deodorant. This device may take the form of a washer in which the sewage is sprayed into a chamber and subjected to the action of chlorine.

From the deodorizer 13, a pipe 14 directs the sewage to a coagulating chamber 15 where suitable chemical coagulants are introduced into the sewage, a sufficient period of time being allowed for the reaction to take place. One form of coagulant is ferric chloride (FeCl₃) although the specific coagulant used constitutes no part of the present invention.

The resulting mixture is then introduced into a centrifugal separator 17 through a pipe 16 where the solids in the sewage are continuously separated. Waste effluent is discharged from the separator through a pipe 18 while the sludge is directed into a continuous mixer 20 through a pipe 19.

From the mixer 20, the sludge is directed through a pipe 21 to a spray head 22 by means of which it is introduced into a spray drying chamber 23. A fan 24 withdraws the dried particles and gas from the drying chamber and directs them through a pipe 25 to a dust collector 26. The solid particles from the dust collector are directed into a furnace 27, the details of which are illustrated in Figures 5 and 6.

In order that the invention may be more effectively carried out, the furnace 27 is preferably positioned above a cooling chamber 28 in order that a continuous flow of molten slag will pass by gravity into a spray mechanism 29 within the cooling chamber. A fan 30 withdraws the medium from the cooling chamber and directs it through a pipe 31 to a dust collector 32 from which the exhaust is directed through a suitable outlet 33 and the chilled slag is collected through an outlet 34.

Waste heat from the furnace 27 is directed through a pipe 35 into a boiler 36, the steam from which is supplied through a pipe 37 to a turbo generator 38. This turbo generator supplies power to suitable mechanism 39 which may be utilized to drive the equipment used in the carrying out of the process as well as power to a plant 40 for making electrolytic chlorine and sodium hydroxide.

After the waste heat from the furnace passes through the boiler 36, it passes, together with entrained fly ash, to the drying chamber 23 through a pipe 41 and is thus further utilized.

Returning to the centrifugal separator, a portion of the effluent is directed into a washer 42 where it takes up waste heat and dust from the dust collector 26 through a pipe 43, being partially concentrated. From the washer 42, the effluent flows through a pipe 44 to a multiple evaporating effect consisting of a plurality of members 45 in series. Exhaust from the washer 42 leaves through an outlet 46 while the concentrated substance is directed through a pipe 47 to the turbo mixer 20 where it is recombined with the previously separated sludge. A portion of the liquid from the centrifugal separator is directed through a pipe 48 to a surface condenser 49 which may be of any standard type. A pipe 50 then carries the liquid to the multiple effect 45, the condensate being removed through an outlet 51. A pipe 52 carries the exhaust steam from the final effect 45 to the condenser 49 in order to maintain the desired vacuum in the multiple effect. If desired, an outlet may be provided in pipe 50 to exhaust some of the steam leaving the condenser 49.

It will be observed that the dust collected from the dust collector 26 is high in organic solids which have not been destroyed by the previous steps to which it has been subjected. This dust is conveyed to the specially designed powdered fuel slagging type furnace 27 which is illustrated in further detail in Figures 5 and 6. In these figures, the walls of the furnace are illustrated at 53, the walls being preferably vertical and of cylindrical formation. Tuyère or nozzles 54 are provided in the walls 53 and are preferably directed as illustrated in Figure 5 in order that a continuous curtain of rotating fluid may be formed. The mixture directed through the nozzles 54 is such as to support perfect combustion and is preferably blown at a rate greater than the rate of flame travel so that the flame cannot strike back. The four flames which are formed thus swing around the cylindrical furnace in a vortex and result in a very intense combustion. The slag passes out at the bottom of the chamber through an outlet 55 and falls upon the rotating spray head 29. As a result, the molten slag is directed outwardly into the spray cooling chamber wherein nozzles 56 are provided to introduce a suitable cooling medium. The cooled slag may be collected by a scraper 57 at the bottom of the cooling chamber where it is collected and directed into the dust collector by the fan 30. The foregoing mechanism may follow the design of apparatus presently available.

In further reference to the structure shown in Figure 6, the spray wheel 29 is preferably formed of a suitable metal such as molded bronze impregnated with graphite or some other material which is later burned out, leaving a porous substance. The wheel is then mounted on the end of a hollow motor shaft 58 through which water is directed under pressure. As the molten slag falls upon the top surface of the spray wheel 29, it will be prevented from touching and adhering to the wheel due to the instantaneous layer of steam formed, since the surface of the wheel would be constantly covered with moisture. As a result, the product would tend to form more quickly into large grains much like the spherical condition of water on a very hot stove. Incidentally, this structure might be utilized satisfactorily in solidifying molten metals of various types and the shape of the wheel 29 may be of any convenient form.

The spray head shown in Figures 2, 3 and 4 includes a body 59 which may be mounted upon a suitable supporting wall 60. The body is formed with an inlet 61 through which substances may be introduced into the head, a chamber 62 being formed within the body. A tube 63 is secured to the bottom of the body and is provided with a bushing 64 at the bottom thereof which is adapted to serve as a valve seat and nozzle member. Within the body 62 and tube 63 is a valve stem 65, upon the lower end of which a spirally formed member 66 is secured. This spirally formed member may be located by a cap 67 which is secured in place by a nut 68. The cap 67 and bushing 64 are preferably formed with cooperating curved surfaces to provide an annular and adjustable nozzle through which the substance may be sprayed under pressure.

The stem 65 may be located by the spiral member 66 which may be received snugly within the lower end of the tube 63 and, at its upper end, the stem is additionally located by a plug 69 which is slidably received within the chamber 62 and preferably provided with labyrinth packing 70. The stem 65 is threadedly engaged with the plug 69 as shown at 71 and extends upwardly above the plug to receive a micrometer wheel 72. An indexing finger 73 is secured to the body 59 and facilitates the proper adjustment of the mechanism in an obvious fashion. Rotation of the wheel 72 thus moves the valve stem 65 axially with respect to the plug 69 and body 59 to vary the outlet between the bushing 64 and the cap 67.

Proper adjustment of the cap with respect to the bushing 64 will cause the substance to be sprayed in a very thin state that almost instantly ruptures into a fine spray or mist surrounding the nozzle tip in a circular horizontal plane.

The plug 69 is formed of greater diameter than the nozzle ring or bushing 64 and the cap 67 so that the liquid pressure will tend to hold the cap 67 against the bushing 64.

In an advantageous form of the mechanism, the plug 69 is threaded with 25 threads per inch, right hand. The threaded portion of the valve stem 65 is received within this threaded portion of the plug 69 and may thus be adjusted upwardly and downwardly. The micrometer wheel 72, in the above device, is divided into 40 equal divisions and, thus, for each division of the micrometer wheel, the stem and nozzle cap is moved .001 inch. After a proper adjustment of the cap 67 is made, the valve stem is locked in position by means of a nut 74 which is preferably threaded upon the valve stem.

In order that the nozzle may be cleaned in the event of clogging, a flooding mechanism is provided comprising a crank member 75 having a yoke-shaped arm 76 adapted to engage suitably formed recesses in the plug 69. Another arm 77 of the crank 75 is formed with an eye 78 to which a suitable operating member 79 is secured. A spring 80 is connected to an eye 81, formed in the body 59, and also connected to the eye 78 in order that the arm 77 may be urged toward the body 59. In this fashion, the yoke-shaped arm 76 urges the plug 69 upwardly and maintains the cap 67 in its desired position. Flooding of the nozzle is effected by pulling on the link 79 to move the cap 67 away from the bushing 64, thus dislodging any solid particles that may cause clogging of the nozzle. It should be observed that the helical member 66 does not constitute a vital part of the mechanism inasmuch as the nozzle functions equally well without such a member present. In such event, of course, care should be taken to space the valve stem properly from the tube 63 adjacent the bushing 64.

In the event that the invention is applied to the disposal of garbage, the elements would include a grinding, milling, or crushing operation such as a pulverizing or attrition mill in order that the garbage may be brought to a uniform fineness preparatory to spray drying.

From the foregoing, it will be observed that the present invention provides a process and apparatus by means of which sewage may be disposed of effectively, being treated in such fashion as to facilitate the disposal of waste products in an unobjectionable manner and form other products which are commercially salable or which are adapted for use in connection with the operation of the system. In addition, the invention includes specific details of structure which have been described above and the invention is not to be limited save as defined in the appended claims.

I claim:

1. The process for the disposal of sewage and other waste material comprising drying the material to convert it into a residue of small substantially dry particles, burning said particles under sufficiently high temperature conditions to form a molten slag residue, and simultaneously spraying and cooling said molten slag to produce a chilled residue of small particles.

2. The process for the disposal of sewage and other waste material comprising drying the material to convert it into a residue of small substantially dry particles, burning said residue to generate sufficient heat to form a molten slag residue and simultaneously centrifugally spraying the slag in the presence of a cooling medium to produce a solidified residue consisting of small particles of slag.

3. The process of the disposal of sewage and other waste material comprising drying the material to convert it into a residue of small substantially dry particles, burning said residue to generate sufficient heat to form a molten slag residue, flowing the slag into contact with a chilling liquid, subjecting the slag and liquid to centrifugal force to spray them into a cooling medium to produce a solidified residue consisting of small particles of slag.

4. The process set forth in claim 2 wherein the waste material is reduced to small substantially dry particles by spraying in a current of gases heated by burning the sewage residue.

5. The process for the disposal of sewage comprising separating a major portion of liquid from the sewage to form a sludge, concentrating the liquid, mixing it with sludge and spray drying the mixture to form a residue of finely divided particles.

6. The process for the disposal of sewage comprising centrifuging sewage to separate an effluent from solid matter, concentrating the effluent by evaporation, mixing the concentrated effluent with the solid matter and spraying the mixture into a current of heated gas to produce a residue of finely divided particles.

WILLIAM SPENCER BOWEN.